(12) United States Patent
Järventie

(10) Patent No.: US 7,517,514 B2
(45) Date of Patent: Apr. 14, 2009

(54) PROCESS FOR TREATING RESIDUE OF ORGANIC MATERIAL

(75) Inventor: Jussi Järventie, Kuhmoinen (FI)

(73) Assignee: Preseco Oy, Espoo (FI)

( * ) Notice: Subject to any disclaimer, the term of this patent is extended or adjusted under 35 U.S.C. 154(b) by 737 days.

(21) Appl. No.: 10/514,848

(22) PCT Filed: Jun. 2, 2003

(86) PCT No.: PCT/FI03/00435

§ 371 (c)(1),
(2), (4) Date: Feb. 3, 2005

(87) PCT Pub. No.: WO03/101914

PCT Pub. Date: Dec. 11, 2003

(65) Prior Publication Data

US 2005/0155401 A1    Jul. 21, 2005

(30) Foreign Application Priority Data

May 31, 2002 (FI) .................................. 20021038

(51) Int. Cl.
*C07C 55/07* (2006.01)
*C01B 25/18* (2006.01)
*C01F 11/18* (2006.01)

(52) U.S. Cl. ................ 423/317; 71/11; 71/15; 71/16; 71/19; 71/20; 71/22; 71/23; 71/903; 423/395; 423/475; 423/497; 423/555; 562/597

(58) Field of Classification Search ........... 71/11–30, 71/903; 562/597; 423/317, 432
See application file for complete search history.

(56) References Cited

U.S. PATENT DOCUMENTS

| | | | | |
|---|---|---|---|---|
| 1,610,109 A | * | 12/1926 | Pease et al. | ........... 71/24 |
| 1,668,464 A | * | 5/1928 | Pease | ........... 71/24 |
| 2,906,615 A | * | 9/1959 | Dumore | ........... 71/18 |
| 3,239,329 A | * | 3/1966 | Burgon | ........... 71/23 |
| 3,773,659 A | * | 11/1973 | Carlson et al. | ........... 210/606 |
| 5,342,600 A | * | 8/1994 | Bleakley et al. | ........... 423/432 |
| 5,376,343 A | * | 12/1994 | Fouche | ........... 423/165 |
| 5,494,651 A | * | 2/1996 | Minayoshi et al. | ........... 423/432 |
| 5,993,503 A | * | 11/1999 | Kruidhof | ........... 71/21 |
| 6,475,459 B1 | | 11/2002 | Virtanen | |
| 6,682,578 B2 | * | 1/2004 | Sower | ........... 71/11 |

FOREIGN PATENT DOCUMENTS

| | | |
|---|---|---|
| CN | 1123260 | 5/1996 |
| DE | 573 036 A | 3/1933 |
| EP | 1 097 913 A1 | 5/2001 |
| FR | 2 372 131 A | 6/1978 |
| FR | 2 648 128 A1 | 12/1990 |
| JP | 61136981 | 6/1986 |
| JP | 8198693 A | 8/1996 |

* cited by examiner

*Primary Examiner*—Wayne Langel
(74) *Attorney, Agent, or Firm*—Sughrue Mion, PLLC

(57) ABSTRACT

A process for treating organic material, separating calcium and recovering phosphorus and to utilization of the obtained products and their use as a soil conditioner and a fertilizer as well as for providing carbon dioxide traps in gas cleaning. In the process, organic ingredients are separated from calcium-phosphate-containing ingredients, the calcium-phosphate-containing ingredients are dissolved in an acid-containing solution and/or the calcium is precipitated as a salt corresponding to the acid, and optionally phosphoric acid formed from a phosphate ion is separated. The invention also relates to a calcium-carbonate-containing product and a phosphoric-acid containing product, which are prepared by the process of the invention.

14 Claims, No Drawings

PROCESS FOR TREATING RESIDUE OF ORGANIC MATERIAL

FIELD OF THE INVENTION

The invention relates to a process for treating residue of organic material, separating calcium, recovering the calcium and/or phosphorus and to utilization of the obtained products and their use as a soil conditioner and a fertilizer and for providing carbon-dioxide traps in gas cleaning.

BACKGROUND OF THE INVENTION

Man is accustomed to utilize products of plant and animal origins for various purposes. Processing and preparation of products intended for nourishment and other useful purposes produce a wide variety of residues, such as fish waste, fish bones and scales, fowl waste, including feathers and cartilages, leaves, stems and peels of potato, carrot, tomatoes and other plants and vegetables, fruit parings and cereal husks, etc. In addition to agriculture and fur farming, various wastes are produced e.g. in tending the soil and the water system, as an example of which can be given large quantities of fish that are caught when the water systems are tended by means of bio manipulation. In the Finnish environment the fish species involved are usually roach fish, and the quantities amount to tons.

Incineration of these wastes or disposal in some other manners is cumbersome, and the processs and equipment used do not generally meet with the current environmental requirements. One problem with treating organic material is that material to be processed accumulates seasonally and it is difficult to store the material. The composition of minerals in the processed wastes makes their utilization difficult: for instance, nitrogen, calcium, potassium and phosphorus seldom occur in desired proportions to one another.

The object of the present invention is to provide a solution to these problems. In particular, the object of the invention is to provide a process, by which utilization of organic material and residues thereof can be enhanced and by which it will be possible to produce end-products for agricultural applications, for instance.

BRIEF DESCRIPTION OF THE INVENTION

On the basis of experiments made in connection with the present invention, hydrolysis residue obtained from decomposition of organic material possesses a distinct fertilizing effect and fertilizing value on the basis of the nutrient analyses and cultivation tests. If nitrogen-rich organic material is used as starting material in a hydrolysis process, it is possible to vary potassium and phosphate contents and/or proportions in order to optimize the nutrient composition for different uses (for instance, for different vegetables and cereals or for different soil types).

Using microbiological processs it is possible to convert nitrates into ammonia and sulphates into hydrogen sulphide, or to precipitate phosphates to form insoluble compounds with alkali earths.

We have found that when organic material, in particular fish pulp, is hydrolysed in the manner described, for example, in the present document, the hydrolysis residue comprises calcium phosphate. Particularly large amounts of calcium phosphate occur as the fish bone material hydrolyses. However, in this form the phosphate is insoluble and therefore useless as a fertilizer for plants.

Thus, the object of the invention is to develop a process and equipment implementing the process for treating organic material and residues thereof, and for separating calcium and recovering phosphoric acid as well as for further utilising the same in gas washing and as soil conditioners and fertilizers. The object of the invention is achieved by a process and a system, which are characterized by what is disclosed in the independent claims. The preferred embodiments of the invention are disclosed in the dependent claims.

The invention is based on converting the calcium phosphate occurring in the organic material or produced in the hydrolysis thereof into a useful form by treating it with an acid, whereby the calcium precipitates as a salt corresponding to the acid and the remaining phosphate ion forms phosphoric acid. The remaining free phosphorus can also be made to form a compound with an ammonium ion.

The formed calcium salt can be separated and further combusted into calcium oxide. When hydrolysed in an aqueous solution the obtained calcium oxide forms calcium hydroxide, which is a good carbon dioxide trap that can be used in cleaning gases. The carbon dioxide present in the gas to be cleaned reacts with the calcium hydroxide formed from the calcium oxide to obtain calcium carbonate.

The formed calcium carbonate can be used as a soil conditioner or a fertilizer, or it can be further burnt. The burning of calcium carbonate requires a temperature below 1000° C.

The remaining phosphoric acid solution can be combined, for instance after decantation, with a hydrolysis residue containing ammonium bicarbonate and/or potassium carbonate, whereby, the carbon dioxide being released, the potassium and ammonium salts have been converted into phosphate forms.

The process and the system of the invention have an advantage of providing cleaner, washed gas containing less carbon dioxide. The invention has a further advantage that the calcium carbonate produced in gas washing can be burnt at a considerably lower temperature than the calcium phosphate, the degradation of which requires a temperature of about 1700° C. Moreover, by calculatorily varying different ingredients in the residue it is possible to control potassium, ammonium nitrogen and phosphorus concentrations and proportions thereof. Thus, it is possible to prepare precisely the most suitable fertilizer compositions for each plant species or soil type.

DETAILED DESCRIPTION OF THE INVENTION

The invention relates to a process for treating residue of organic material and it comprises the steps of a) separating the organic ingredients in the residue from the calcium-phosphate-containing ingredients, b) adding the calcium-phosphate-containing ingredients to an acid and/or c) precipitating the calcium as a salt corresponding to the acid, and optionally d) separating the phosphoric acid formed from a phosphate ion.

Thereafter the calcium salt can be optionally combusted to obtain calcium oxide that forms with water calcium hydroxide that acts as carbon dioxide traps in gas cleaning.

The formed calcium carbonate can be recovered.

In this connection the organic material refers to any organic material. The organic material can be of plant or animal origin. The material of plant origin can be, for instance, a cultivated plant or cultivated plant waste, such as cabbage, potato or potato peel. The material of animal origin can be, for instance, fish pulp, such as fish or fish waste or fowl or fowl waste or bone meal mix. The material of animal origin is particularly fish pulp.

In this publication the residue of organic material refers to organic material as such or treated in various ways.

The term residue is intended to emphasize that the material is not utilized in any other way, for instance as human nourishment or animal feed.

The organic material, such as bones and fish bones, can be used as such. Its decomposition can also be enhanced by suitable pre-treatment processes, of which one advantageous example is microbiological or chemical decomposition or hydrolysis.

Hydrolysis residue is obtained, for instance, from a bioconversion process and it can be either completely or partly hydrolysed organic material.

The hydrolysis takes place at normal pressure or at a pressure exceeding the atmospheric pressure. The hydrolysis advantageously takes place at a pressure exceeding the atmospheric pressure, such as at a pressure of 1.1 to 6 bar, advantageously at a pressure of about 2 bar.

In the process of the present invention organic ingredients of the residue are separated from the calcium-phosphate-containing ingredients by any conventional method. The separation can be carried out, for instance, by decanting the organic material from the residue, the resultant being calcium-phosphate-containing substance containing water as little as possible. The separation can also be carried out by removing calcium-phosphate-containing substance from the bottom of the reaction vessel. The separation can also be performed by compression or centrifuge separation, for instance.

Any organic or inorganic acid that is stronger than phosphoric acid can serve as the acid. Examples of these acids include $HClO_4$, $HCl$, $H_2SO_4$, $HNO_3$ and $(COOH)_2$. Advantageously the acid used is oxalic acid, because it is an organic acid and thereafter the product can still be decomposed by combustion. The amount of the formed and precipitated salt can be varied by varying the amount of acid.

The present invention can be implemented at normal pressure or at a pressure exceeding the normal atmospheric pressure, for instance, at a pressure of 1.2 to 6 bar, advantageously about 2 bar.

The calcium phosphate forms a salt, which is a salt corresponding to the acid used. Advantageously there is formed a calcium oxalate salt. The obtained salt is separated and optionally combusted, which produces calcium oxide. The calcium oxide reacts with water and forms calcium hydroxide, which acts as carbon dioxide traps that can be used for washing and cleaning gas.

The gas to be cleaned is a carbon-dioxide-containing gas, advantageously a flue gas or a biogas, and it is recovered and used as a greenhouse gas, for heating, for electricity production or as a fuel.

In connection with gas washing the calcium hydroxide reacts with carbon dioxide obtaining calcium carbonate, which can be used for soil conditioning or as a fertilizer. The calcium carbonate can also be incinerated. The calcium carbonate can be incinerated in a furnace, the required temperature being below 1000° C.

The invention also relates to phosphoric acid prepared by a process, in which calcium-phosphate-containing constituents are separated from the organic ingredients of the organic material residue and the calcium-phosphate-containing constituents are added to the acid, whereby a free phosphate ion present in the solution forms phosphoric acid in the reaction and the formed phosphoric acid is recovered.

The invention also relates to a phosphoric-acid-containing product, which is prepared by a process, in which a phosphoric acid solution is decanted and combined with a hydrolysis residue containing ammonium bicarbonate and potassium carbonate, whereby, carbon dioxide being released, the potassium salts and the ammonium salts are converted into phosphate forms. The obtained phosphoric-acid-containing product can also be used as a soil conditioner, a fertilizer or as a fertilizer-like product. Through calculated variation of different moieties it is possible to control potassium, ammonium nitrogen and phosphorus concentrations and the proportions thereof, and consequently to produce more plant-specific and soil-specific fertilizing and soil conditioning products.

The invention also relates to a calcium-carbonate-containing product, which is prepared by a process, in which calcium-phosphate-containing constituents are separated from the organic ingredients of the organic material residue and the calcium-phosphate-containing constituents are added to the acid, the calcium is precipitated as a salt corresponding to the acid, the calcium salt is combusted to obtain calcium oxide, which forms with water calcium hydroxide that is reacted with carbon dioxide into calcium carbonate and the obtained calcium carbonate is recovered. The calcium-carbonate-containing product can be used as a soil conditioner, a fertilizer or a fertilizer-like product. The calcium carbonate can also be re-combusted to form a carbon dioxide trap.

It is apparent to a person skilled in the art that as technology advances the basic idea of the invention can be implemented in a variety of ways. Thus, the invention and its embodiments are not restricted to the above-described examples, but they may vary within the scope of the claims.

EXAMPLES

Example 1

Treatment of Minor Fish Bones

There was prepared a solution comprising 10 g minor fish bones and 100 ml of 5-% oxalic acid, and the solution was mixed for 30 minutes. The pH of the solution was 1.2 and it had a slight odour of hydrogen sulphide. The minor fish bones dissolved gradually and were further precipitated. Thereafter the solution was filtered with GF/B vacuum filtration and a phosphate content in the solution was assayed with an UV apparatus. The $PO_4^{3-}$ content was 7300 mg/l.

Example 2

Treatment of Bone Meal

There was prepared a solution comprising 10 g bone meal and 100 ml of 5-% oxalic acid, and the solution was mixed for 60 minutes. Thereafter the solution was filtered with GF/B vacuum filtration and a phosphate content in the solution was assayed with an UV apparatus. The $PO_4^{3-}$ content was 15000 mg/l.

Example 3

Treatment of Major Fish Bones

There was prepared a solution comprising 5 g major fish bones and 5 g oxalic acid dehydrate in 100 ml of water. The solution was mixed for 60 minutes and thereafter the solution was allowed to rest for 1 hour. Thereafter the solution was filtered with GF/B vacuum filtration and a phosphate content in the solution was assayed with an UV apparatus. The $PO_4^{3-}$ content was 7000 mg/l.

Example 4

Treatment of Major Fish Bones

There was prepared a solution comprising 5 g major fish bones and 5 g oxalic acid dehydrate in 100 ml of water. The solution was allowed to rest for 60 minutes, thereafter the solution was mixed for 120 minutes. The solution was filtered with GF/B vacuum filtration and a phosphate content in the solution was assayed with an UV apparatus. The $PO_4^{3-}$ content was 8500 mg/l.

Example 5

Formation and Treatment of the Hydrolysis Residue of Organic Material

To a reactor R1, having a capacity of 300 liters, was introduced organic material that comprised 18.8 kg bone meal, 28.9 kg fish and 3.8 kg genetically manipulated yeast (Genencor) and also 20 liters inoculum containing own microbes of different fishes and yeast. The pressure in the reactor was 2 bar. The pH in the reactor was 8.2. The total $NH_2$ content was determined with spectrophotometer and it was 9200 mg/l. In addition the amount of carbonates was determined by means of sulphuric acid and the ammonium ion content thereof was calculated as ammonium carbonate. The calculation gave the ammonium ion content of 8700 mg/l and the carbonate content of 46300 mg/l. Alkalinity and phosphate content were also determined. The alkalinity was 32000 and the phosphate content was 1200 mg/l. The amount and composition of the biogas obtained from the reactor were measured. On the following day, the reactor yielded 109.4 l/day biogas that contained 74.6% $CH_4$ and 20.0% $CO_2$.

The biogas obtained from the reactor R1 can be recycled into a reactor containing strongly ammoniacal biowaste, in which reactor the carbon dioxide further reacts with the ammonia and forms a buffer compound. In that case the toxicity of the ammonia disappears and the conditions will be optimal for microbes.

Partly or completely hydrolysed residue is taken at desired intervals from either one of the reactors and is treated with an acid as described in Examples 1 to 4. When hydrolysis is used as a pre-treatment, the total process becomes quicker and more effective.

The invention claimed is:

1. A process for treating residue of organic material, which process comprises separating the organic ingredients in the residue from the calcium-phosphate-containing ingredients, wherein the process further comprises
    i) adding the calcium-phosphate-containing ingredients to oxalic acid, and
    ii) precipitating the calcium as a calcium oxalate salt, and
    iii) separating the phosphoric acid formed from a phosphate ion.

2. A process as claimed in claim 1, wherein the residue that is treated is waste material of the organic material or its hydrolysis residue obtained from bioconversion.

3. A process as claimed in claim 2, wherein the organic material is of animal origin.

4. A process as claimed in claim 3, wherein the material of animal origin is fish, fish waste, fowl or fowl waste.

5. A process as claimed in claim 2, wherein the organic material is of plant origin.

6. A process as claimed in claim 5, wherein the material of plant origin is a cultivated plant, cultivated plant waste, such as cabbage, potato or potato peel.

7. A process as claimed in claim 1, wherein the process takes place at normal pressure.

8. A process as claimed in claim 1, wherein the process takes place at a pressure exceeding the atmospheric pressure.

9. A process as claimed in claim 8, wherein the process takes place at a pressure of about 1.2 to 6 bar.

10. A process as claimed in claim 1, wherein the formed phosphoric acid solution is decanted and recovered.

11. A process as claimed in claim 10, wherein the recovered phosphoric acid solution is combined with the hydrolysis residue of the organic material.

12. A process as claimed in claim 11, wherein the product containing phosphoric acid and hydrolysis residue is used as a soil conditioner, a fertilizer or a fertilizer-like product.

13. A process as claimed in claim 1, wherein the process takes place at a pressure of about 2 bar.

14. A method of making a calcium-carbonate-containing product, comprising
    separating calcium-phosphate-containing constituents from the organic ingredients of an organic material residue,
    adding the calcium-phosphate-containing constituents to oxalic acid,
    precipitating calcium as a calcium oxalate salt,
    combusting the calcium oxalate salt to obtain calcium oxide, which forms with water calcium hydroxide,
    reacting the calcium hydroxide with carbon dioxide to form calcium carbonate, and
    recovering the obtained calcium carbonate.

* * * * *